Dec. 2, 1941.                W. FOERSTE                2,265,068
SCINTILLATING GASEOUS DISCHARGE LAMP AND METHOD OF OPERATING THE SAME
Filed May 12, 1937
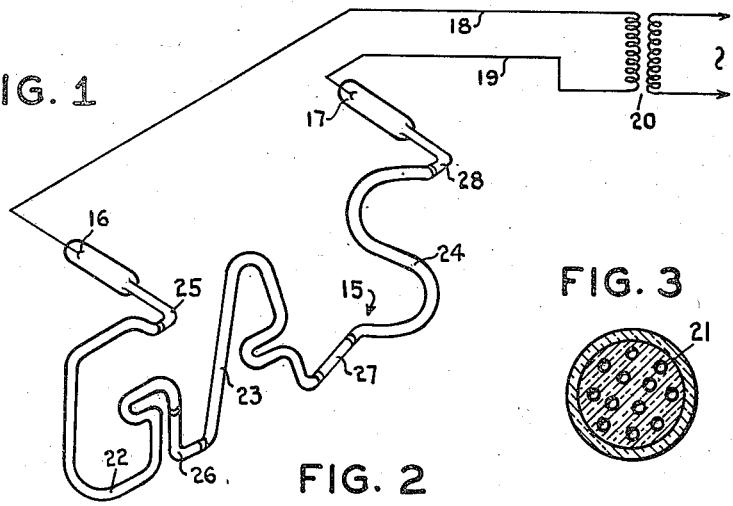
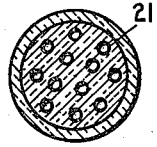
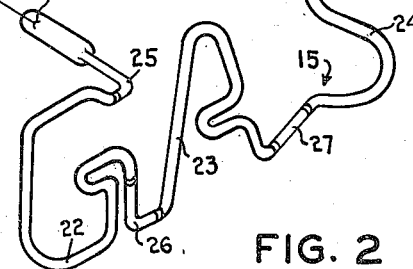
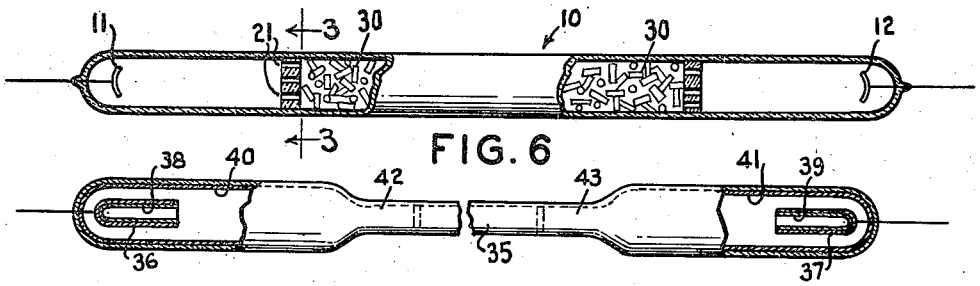
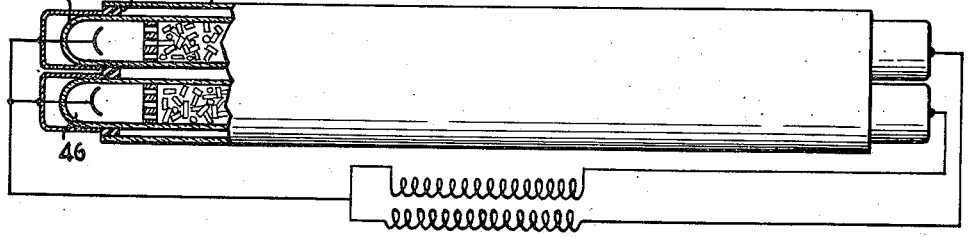
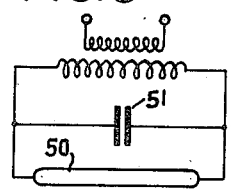
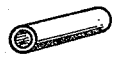
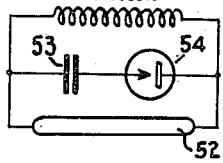
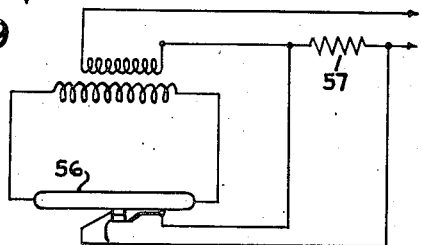
INVENTOR.
William Foerste
BY
ATTORNEY.

Patented Dec. 2, 1941

2,265,068

UNITED STATES PATENT OFFICE 2,265,068

SCINTILLATING GASEOUS DISCHARGE LAMP AND METHOD OF OPERATING THE SAME

William Foerste, Pelham Manor, N. Y.

Application May 12, 1937, Serial No. 142,107

12 Claims. (Cl. 176—124)

The invention relates to gaseous discharge lamps wherein an electric discharge is effected between two electrodes located at the opposite ends of a light-transmitting envelope for a suitable gas which is ionized by the discharge and rendered luminous.

The present invention has for an object to so operate a lamp of this type as to obtain therefrom a scintillating effect and particularly to secure various color combinations or blends through such operation.

A further object of the invention resides in the provision of a gaseous discharge lamp of novel construction whereby to enhance the effect of the discharge; and also in novel circuit arrangements for the operation of the lamp.

In carrying out the invention, a continuous light-transmitting envelope, such as a glass tube, is fashioned in the usual manner into letters, words, designs, etc., and filled with the particular gas or gases required to secure the desired color effects when an electrical discharge takes place between electrodes disposed at the opposite ends of the envelope. At each end of the envelope and beyond the corresponding electrode is mounted a transversely disposed plug of ceramic material, mica or other suitable substance, the same being perforated or provided with openings to permit an electrical discharge to proceed through the envelope from one electrode to the other. In the space between these plugs, there is introduced a multiplicity of light-transmitting elements which are hollow to divert the discharge therethrough and which serve also to impede said discharge and cause it to thread its way over and around the elements, whereby the discharge will be caused to travel a much greater distance than the direct path between the electrodes and to be intensified when passing through the constricted passageway of an element.

In accordance with the invention, these hollow and tubular elements are light-transmitting and may also be variously colored and of different sizes and shapes; and the interior or exterior wall of the envelope may be suitably colored or the tube itself be of an opal or fluorescent material, whereby additional effects may be attained. In addition, a "ripple" effect may be introduced in the discharge.

A further effect is secured by introducing into the envelope a plurality of gases emitting different colors when ionized, the effects of one or more of the gases being more or less suppressed in the discharge portion passing through a constricted space, such as afforded by the hollow elements, and wherein the discharge is more intense. Another effect is secured by varying the A.-C. wave characteristics of the energizing circuits for the lamp, the color character of the discharge being sensitive also in the case of certain gases to the temperature of the lamp. Provision is made to control this temperature automatically through regulation of the energizing current for the lamp.

I am aware that it has been proposed heretofore to secure a more or less scintillating effect by introducing solid broken particles in the space between electrodes between which a discharge is effected. However, these solid particles even when not opaque do not allow for the desired light transmission, and, of course, fail to provide constricting passageways through the material particles. In addition, the novel lamp has a substantially lower resistance, generating less heat, and is therefore more economical in operation. Various color combinations, also, are possible with discharge through but a single gas, depending upon whether the discharge takes place through or above or below a hollow particle.

The nature of the invention, however, will best be understood when described in connection with the accompanying drawing, in which:

Fig. 1 is a more or less diagrammatic view illustrating in perspective the novel gaseous discharge lamp apparatus and the associated energizing circuit.

Fig. 2 is a plan view on an enlarged scale illustrating the novel lamp, and Fig. 3 is a transverse section therethrough taken on the line 3—3, Fig. 2, and looking in the direction of the arrows.

Fig. 4 is a perspective view, on an enlarged scale, of a hollow constricting element utilized in the discharge lamp; and Fig. 5 is a similar view illustrating a modification therein.

Fig. 6 is a plan view of a modified form of a lamp.

Fig. 7 is a plan view partly in longitudinal section illustrating a plurality of the novel lamps contained within a transparent envelope, and the operating circuit therefor.

Figs. 8, 9 and 10 are diagrammatic views illustrating various modifications in the operating circuits for the novel gaseous discharge lamp; and Fig. 10 illustrates, further, a thermostatic control for the lamp.

Referring to the drawing, more especially Figs. 1-3 thereof, 10 designates a light-transmitting envelope such as a glass tube or the like for retaining an ionizable gas designed to become illuminated when subjected to an electrical discharge, for example, a gas such as neon, argon, mercury vapor, etc., or mixtures thereof. The discharge is effected therein between electrodes 11 and 12, located at the opposite ends of the tube and designed to be connected to a suitable source of high-potential electricity. The tube may be variously fashioned in the usual manner into letters, words, designs, etc., for example, as indicated in Fig. 1 which sets forth a three-letter word fashioned of a tube member 15, having separated electrodes 16 and 17 located at its opposite ends, the electrodes being connected through conductors 18 and 19, respectively, to the secondary of a transformer 20—all of which is well known and forms no particular part of the present invention.

In accordance with the invention, a tube or envelope is divided into a scintillating or active portion by means of a plurality of insulating plugs as of ceramic material, mica, etc. These plugs are arranged transversely of a tube to substantially block the discharge except through perforations or passageways 21 provided therethrough; and they serve also to divide a tube into the normal-discharge portions and the active scintillating portions. Thus, as indicated in Fig. 1 of the drawing, each letter of the word comprises the scintillating portions, as the respective portions 22, 23, and 24, separated by normal-discharge portions 25, 26, 27, and 28, which portions are those normally painted out.

In the space between these plugs and which is the active or useful portion of a tube, there is introduced a multiplicity of light-transmitting elements, as the elements 30, Fig. 2, and which are shown more particularly in Figs. 4 and 5. These elements are of light-transmitting material and hollow or tubular to permit a discharge to thread its way therethrough, as well as to cascade over and around the same, the discharge being intensified in passing through such element, due to its constricted passageway, as well as by the partial blocking of the path of discharge by contiguous elements. The elements may also be variously colored and of different sizes and shapes, whereby a great variety of combinations in the resulting luminous effects is attained; also through the zig-zag, continuously changing course of the discharge, as well as because of the plurality of streams discharged through the plugs.

A further effect may be attained in the luminous manifestations by constricting, in part at least, the active or scintillating portion of a tube as indicated at 35, Fig. 6 of the drawing.

This type of lamp with constricted envelope lends itself also particularly to the production of a ripple effect in the discharge and as well to the use of a plurality of ionizable gases, for if the intensity of the discharge in the reduced or constricted portion 35 be sufficient, the effect of one gas may predominate in portions of the tube over that of the other, especially if the latter be present in a lesser amount. The ripple effect is known to be generally due to vapors other than that of the ionizable gas present in the tube.

These may conveniently be introduced by providing the electrodes of the tube in the nature of cups 36 and 37 coated upon their respective surfaces 38 and 39 with a gas-evolving material, preferably organic material, for example, hydrocarbons such as anthracene and oils and distillates, rosolic and other organic acids, various resins and gums, etc., which vaporize more or less as the tubes heat under the discharge between the electrodes and decompose under the electronic bombardment.

The life of the lamp, moreover, is increased and greater stability of operation attained by introducing with the organic material, or in the path of discharge, substances which absorb undesirable gases present, such substances, for example, as mercury, tin, lead, activated carbon, etc., and known in the art as "getters."

The cup-shaped electrodes may be of conducting material such as metal, carbon, graphite, etc.; or of ceramic material, in which case the organic coating renders the electrode conductive.

It is desirable, also, to have the electrode-enclosing portions of the tube enlarged to afford a greater cooling area and thus retain any condensation of the vapors, as indicated at 40 and 41, within the non-active portion of a tube so as not to obscure its desired luminous effects. By advancing the plugs along the constricted portion 35, the ripple effect alone may be provided at the end portions 42 and 43 with the combined scintillating and ripple effect produced therebetween, thus further enhancing the general effect.

Additional color combinations may be secured by coating the interior or exterior of the active portion of the tube with a suitable light-transmitting color or lacquer; and also by combining two or more tubes within a surrounding envelope of light-transmitting material. Thus, reference being had to Fig. 7 of the drawing, two tubes 45 and 46 are indicated as mounted within an outer envelope 47 of glass or other light-transmitting material, the tubes being held therein and relatively to each other by suitable spacers 48. The outer envelope may be clear, frosted, or colored.

I have found, furthermore, by altering, from its usual sine wave form, the phase or electrical characteristics of the operating current supplied to a lamp of this nature, that the character of the discharge may be made irregular to enhance thereby the scintillating effect. For example, as indicated in Fig. 8, there may be connected across the tube 50 a condenser 51; or, as indicated in Fig. 9, across the tube 52 both a condenser 53 and a rectifier 54 in series therewith.

In Fig. 10, a further current modifying means is indicated, namely in the provision of a metal thermostatic contact-making device 55 carried by the tube 56 and thus subjected to the temperature thereof. This thermostat is designed to introduce a resistance 57, normally short-circuited thereby, but introduced when the temperature of the tube 56 exceeds a predetermined degree. When thus introduced, resistance 57 reduces the discharge current and consequently the heat evolved by the tube, which is thus maintained within the required temperature limits to produce the fundamental colors continuously, in the case of a plurality of ionizable gases.

A further effect is possible through the variation in intensity of discharge by the use of the thermostat when there is introduced into the tube also mercury vapor, that is to say, a small amount of mercury vaporizable under the heat developed in the tube. The mercury vapor content thus developed will depend on the heat of the tube, which in turn is controlled by the thermostat; and the color effect resulting will, of course, depend on the relative amount of mercury vapor present during the discharge.

I claim:

1. The method of producing a scintillating effect with gaseous discharge lamps, which comprises passing a discharge of electricity through an envelope containing a gas to develop thereby a predetermined color of illumination, intensifying the discharge at different points of the envelope by diverting it through light-transmitting elements contained within said envelope and affording constricted passageways for said discharge, and altering in accordance with the temperature of the envelope the electrical characteristic of the current applied to the electrodes for affecting the discharge.

2. A gaseous discharge lamp, comprising a light-transmitting envelope, separated electrodes mounted therein for discharge of electricity through a gas contained in said envelope, insulating and perforated plugs in said envelope beyond each of the electrodes, and a multiplicity of tubular, light-transmitting members affording constricted passageways for said discharge and located between said plugs.

3. A gaseous discharge lamp, comprising a light-transmitting envelope, separated electrodes coated with organic matter and mounted within the envelope for discharge of electricity through a gas contained in said envelope, and a multiplicity of tubular, light-transmitting members affording constricted passageways for said discharge and located between said electrodes within the envelope for diverting a charge therethrough.

4. A gaseous discharge lamp, comprising a light-transmitting envelope, separated cupped electrodes containing organic matter and mounted within the envelope for discharge of electricity through a gas contained in said envelope, and a multiplicity of tubular, light-transmitting members affording constricted passageways for said discharge and located between said electrodes within the envelope for diverting a charge therethrough.

5. A gaseous discharge lamp, comprising a light-transmitting envelope enlarged at its opposite ends, a pair of electrodes coated with organic matter and mounted in the respective enlarged ends of the envelope for discharge of electricity through a gas contained in said envelope, and a multiplicity of tubular, light-transmitting members affording constricted passageways for said discharge and located between said electrodes within the envelope for diverting a charge therethrough.

6. A gaseous discharge lamp, comprising a light-transmitting envelope containing a plurality of gases for emitting respectively when ionized light of different colors, separated electrodes coated with organic matter and mounted within the envelope for discharge of electricity through the gases contained therein, and a multiplicity of tubular, light-transmitting members affording constricted passageways for said discharge and located between said electrodes within the envelope for diverting the discharge therethrough.

7. A gaseous discharge lamp, comprising a light-transmitting envelope, separated electrodes mounted therein for discharge of electricity through a gas contained in said envelope, a multiplicity of tubular, light-transmitting members affording constricted passageways for said discharge and located between said electrodes within the envelope for diverting the discharge therethrough, and a thermostatic contact device carried by the envelope and subject to the temperature thereof for varying the current applied to the electrodes.

8. A gaseous discharge lamp, comprising a light-transmitting envelope, separated electrodes mounted therein for discharge of electricity through a gas contained in said envelope, a multiplicity of tubular, light-transmitting members affording constricted passageways for said discharge and located between said electrodes within the envelope for diverting the discharge therethrough, and a condenser bridged across the lamp.

9. A gaseous discharge lamp, comprising a light-transmitting envelope, separated electrodes mounted therein for discharge of electricity through a gas contained in said envelope, a multiplicity of tubular, light-transmitting members affording constricted passageways for said discharge and located between said electrodes within the envelope for diverting the discharge therethrough, and a condenser and a rectifier in series therewith bridged across the lamp.

10. A gaseous discharge lamp, comprising a light-transmitting envelope containing a plurality of gases, one of which produces a ripple effect in the other when subjected to the discharge, separated electrodes mounted in the envelope for discharge of electricity through the gases in said envelope, and means effecting constricted passageways in a predetermined section of the envelope to afford a scintillating effect in this section, the ripple effect alone occurring in the remainder of the envelope.

11. A gaseous discharge lamp, comprising a light-transmitting envelope containing a plurality of gases, one of which ionizes more readily than another when subjected to the discharge, separated electrodes mounted in the envelope for discharge of electricity through the gases in said envelope, and means effecting constricted passageways in a limited section of the envelope to afford a scintillating effect in this section, a ripple effect alone occurring in the remainder of the envelope.

12. A gaseous discharge lamp, comprising a light-transmitting envelope containing a plurality of gases, one of which is a metal vapor and one of which ionizes more readily than another when subjected to the discharge, separated electrodes mounted in the envelope for discharge of electricity through the gases in said envelope, and means effecting constricted passageways in a limited section of the envelope to afford a scintillating effect in this section, a ripple effect alone occurring in the remainder of the envelope.

WILLIAM FOERSTE.